United States Patent
Santiago et al.

(10) Patent No.: US 8,593,968 B2
(45) Date of Patent: Nov. 26, 2013

(54) QUALITY OF SERVICE MANAGEMENT FOR MESSAGE FLOWS ACROSS MULTIPLE MIDDLEWARE ENVIRONMENTS

(75) Inventors: Rodolfo A. Santiago, Bellevue, WA (US); Robert J. Winig, Rancho Palos Verdes, CA (US); Changzhou Wang, Bellevue, WA (US); Guijun Wang, Issaquah, WA (US); Alice Chen, Redmond, WA (US)

(73) Assignee: The Boeing Company, Chicago, IL (US)

( * ) Notice: Subject to any disclaimer, the term of this patent is extended or adjusted under 35 U.S.C. 154(b) by 188 days.

(21) Appl. No.: 13/107,396

(22) Filed: May 13, 2011

(65) Prior Publication Data

US 2011/0213872 A1    Sep. 1, 2011

Related U.S. Application Data

(63) Continuation of application No. 11/936,558, filed on Nov. 7, 2007, now Pat. No. 7,974,204.

(51) Int. Cl.
*G06F 15/16* (2006.01)
*H04L 1/00* (2006.01)

(52) U.S. Cl.
USPC ............................................ 370/235; 709/223

(58) Field of Classification Search
USPC ........... 370/235, 252, 468, 229; 709/223, 232
See application file for complete search history.

(56) References Cited

U.S. PATENT DOCUMENTS

| | | | |
|---|---|---|---|
| 7,212,491 B2 * | 5/2007 | Koga | 370/229 |
| 7,213,071 B2 | 5/2007 | DeLima et al. | |
| 7,545,753 B2 * | 6/2009 | Stirbu | 370/252 |
| 7,751,414 B2 * | 7/2010 | Lee et al. | 370/401 |
| 2002/0141446 A1 | 10/2002 | Koga | |
| 2003/0217128 A1 * | 11/2003 | Yanosy | 709/223 |
| 2004/0193703 A1 | 9/2004 | Loewy et al. | |
| 2005/0013244 A1 | 1/2005 | Parlos | |
| 2005/0114541 A1 * | 5/2005 | Ghetie et al. | 709/232 |
| 2005/0204054 A1 * | 9/2005 | Wang et al. | 709/232 |
| 2006/0080419 A1 | 4/2006 | Patrick et al. | |
| 2006/0241909 A1 | 10/2006 | Morgan et al. | |
| 2006/0294112 A1 | 12/2006 | Mandato et al. | |
| 2007/0067476 A1 | 3/2007 | Karhinen et al. | |
| 2007/0291791 A1 | 12/2007 | English et al. | |
| 2008/0025230 A1 | 1/2008 | Patel et al. | |

(Continued)

OTHER PUBLICATIONS

Unknown, Search Report for Application No. 08 847 564.5-2416, Aug. 5, 2011, 6 pages, European Patent Office, Germany.

(Continued)

*Primary Examiner* — Chi Pham
*Assistant Examiner* — Robert Lopata
(74) *Attorney, Agent, or Firm* — Armstrong Teasdale LLP (57) ABSTRACT

A method of managing information system resources to provide a message flow having a consistent level of quality of service (QoS) within and across a plurality of interconnected middleware domains is described. The method includes receiving a QoS message from a first QoS manager expressing at least one QoS requirement, translating the at least one QoS requirement to at least one parameter specific to a messaging service that communicatively couples multiple middleware domains, creating a client connection between a first middleware domain and the messaging service for receiving the message flow, transmitting the QoS message to a second middleware domain, and creating a client connection between the messaging service and the second middleware domain for transmitting the message flow.

18 Claims, 4 Drawing Sheets

(56) References Cited

U.S. PATENT DOCUMENTS

| | | | |
|---|---|---|---|
| 2008/0080534 A1 | 4/2008 | Lee et al. | |
| 2008/0095057 A1* | 4/2008 | Zhou | 370/235 |
| 2008/0225721 A1* | 9/2008 | Plamondon | 370/235 |
| 2008/0291916 A1* | 11/2008 | Xiong et al. | 370/392 |
| 2008/0310303 A1* | 12/2008 | Wang et al. | 370/230.1 |
| 2009/0116439 A1* | 5/2009 | Madan et al. | 370/329 |
| 2010/0020681 A1* | 1/2010 | Nakashima et al. | 370/229 |

OTHER PUBLICATIONS

International Search Report and Written Opinion of PCTIUS2008/081909; Feb. 19, 2009; 17 pages.

Ditze, M. et al.; Quality of Service and Proactive Content Replication in UPNP Based AN Environments; Parallel and Distributed Computing and Networks; Feb. 15, 2005; pp. 729-734.

Chen, H. et al.; OCWS: An Implementation of OoS-Capable Multimedia Web Services; Multimedia Software Engineering Proceeding—5th International Symposium; Dec. 10, 2003; pp. 1-8; IEEE; Piscataway, NJ.

Tao, Y. et al; A Broker-Based Framework for OoS-Aware Web Service Composition; E-Technology, E-Commerce and E-Service Proceedings—The 2005 IEEE International Conference on Hong Kong, China; Mar. 29, 2005; pp. 22-29; IEEE; Piscataway, NJ.

Berbner, R. et al.; An Architecture for a OoS Driven Composition of Web Service Based Workflows; Networking and Electronic Commerce Research Conference; Oct. 6, 2005; pp. 1-10; Riva Del Garda, Italy.

Berbner, R. et al.; An Approach for the Management of Service-Oriented Architecture (SoA) Based Application Systems; Oct. 24, 2005; pp. 1-14; Klagenfurt, Austria.

European Search Report 01 Application No. 08 847 564.5-2416; Sep. 27, 2010; 7 pages.

* cited by examiner

QUALITY OF SERVICE MANAGEMENT FOR MESSAGE FLOWS ACROSS MULTIPLE MIDDLEWARE ENVIRONMENTS

CROSS-REFERENCE TO RELATED APPLICATIONS

This application is a continuation application of application Ser. No. 11/936,558, filed 7 Nov. 2007, now U.S. Pat. No. 7,974,204, which is hereby incorporated by reference in its entirety.

BACKGROUND OF THE INVENTION

This invention relates generally to information systems and, more particularly, to Quality of Service (QoS) management in information systems that include multiple middleware environments.

QoS management may be implemented in a networked information management system to optimize the use of system resources by a plurality of concurrent network applications. Units of work in information management systems generally can be considered as either tasks or messages. In an object-oriented system, a primitive task may be, for example, a thread of execution of an object. Messages typically are encapsulations of information of various types. Systems tend to be task-oriented or message oriented. Accordingly, known QoS management methods tend to be either task-oriented or message-oriented.

Although QoS management concepts and frameworks for task-oriented systems and message-oriented systems may be similar, actual implementation techniques tend to be quite different. In task-oriented systems, QoS management techniques typically focus on prioritizing task executions to meet application QoS requirements. In message-oriented systems, QoS management techniques typically focus on quality of message reception, processing, and delivery. Meanings of quality characteristics such as performance and reliability can be slightly different from those in task-oriented systems. For example, message reliability typically means a combination of delivery guarantees, ordering of messages, and duplicate removals. Task reliability, on the other hand, typically means a probability that a task can be successfully executed without failure.

QoS management is currently used in task-oriented systems to support computational applications for getting high priority tasks done in a timely manner in distributed environments. However, QoS management for message-oriented information management systems has not been given as much attention. Such systems include information management systems in which service-oriented architectures (SOAs) are implemented. SOAs may be, for example, publish/subscribe, object request broker, peer-to-peer architectures or combinations thereof.

In a publish/subscribe architecture, an information broker provides services to client applications of a system. Information brokers play a central role in information publication, processing, and dissemination in distributed information management systems and network centric military systems. Examples of brokered systems include email, information sphere, collaboration, virtual community, and group communication. It can be difficult in a brokered system to meet requirements of critical clients when many concurrent clients and their requests compete for system resources. Known resource management methods for information brokers may not distinguish between clients with different QoS characteristics so that system resources, even across multiple middleware domains, might be managed accordingly.

SUMMARY

Various embodiments of the present invention may address the above identified deficiencies, and others, by applying consistent, policy driven Quality of Service (QoS) requirements on message flows within and across multiple and diverse message-oriented-middleware (MOM) environments or domains.

In one embodiment, a method of managing information system resources to provide a message flow having a consistent level of quality of service (QoS) within and across a plurality of middleware domains is described. The method includes receiving a QoS message from a first QoS manager expressing at least one QoS requirement, translating the at least one QoS requirement to at least one parameter specific to a messaging service that communicatively couples multiple middleware domains, creating a client connection between a first middleware domain and the messaging service for receiving the message flow, transmitting the QoS message to a second middleware domain, and creating a client connection between the messaging service and the second middleware domain for transmitting the message flow.

In another embodiment, a quality of service (QoS) bridge for providing a message flow having a consistent level of QoS within and across a plurality of interconnected middleware domains is described. The QoS bridge configured to receive at least one QoS requirement from a first QoS manager, propagate the at least one QoS requirement to a second QoS manager, and translate the at least one QoS requirement to at least one QoS parameter. The QoS bridge also configured to utilize a messaging service to receive and enforce the at least one QoS parameter and facilitate the message flow between the plurality of interconnected middleware domains.

In yet another embodiment, a quality of service (QoS) management system for managing QoS in an information system that includes at least a first middleware solution and a second middleware solution executed by at least one processor is described. The QoS management system includes a first QoS manager configured to execute on the at least one processor such that a QoS message expressing at least one QoS parameter is received from a client of the information system, a QoS bridge configured to execute on the at least one processor such that the QoS message is received from the first QoS manager, and a second QoS manager configured to execute on the at least one processor such that the QoS message from the QoS bridge is received by the second QoS manager and forwarded to a subscriber of the information system, providing end-to-end message flow having consistent QoS between the client and the subscriber.

DETAILED DESCRIPTION

The following description is merely exemplary in nature and is in no way intended to limit application or use. Although one or more configurations are described with reference to a publisher/subscriber information management service-oriented architecture (SOA), the configurations are not so limited. Other and additional configurations are contemplated in connection with other types of information systems, including but not limited to other and additional types of service-oriented architectures, information management systems and/or networked systems.

Generally, a system having a service-oriented architecture (SOA) may be treated as a composition of a collection of services. Each service may make its functionality available via a clearly defined interface. In a SOA, each service typically is a self-describing and open software component. A SOA includes services, their compositions and interactions. Methods of managing resources of an information system relative to clients of the system are described below. An exemplary method of managing resources of an information system is also described in U.S. Patent Publication Number 2005/0204054.

Figure 1:
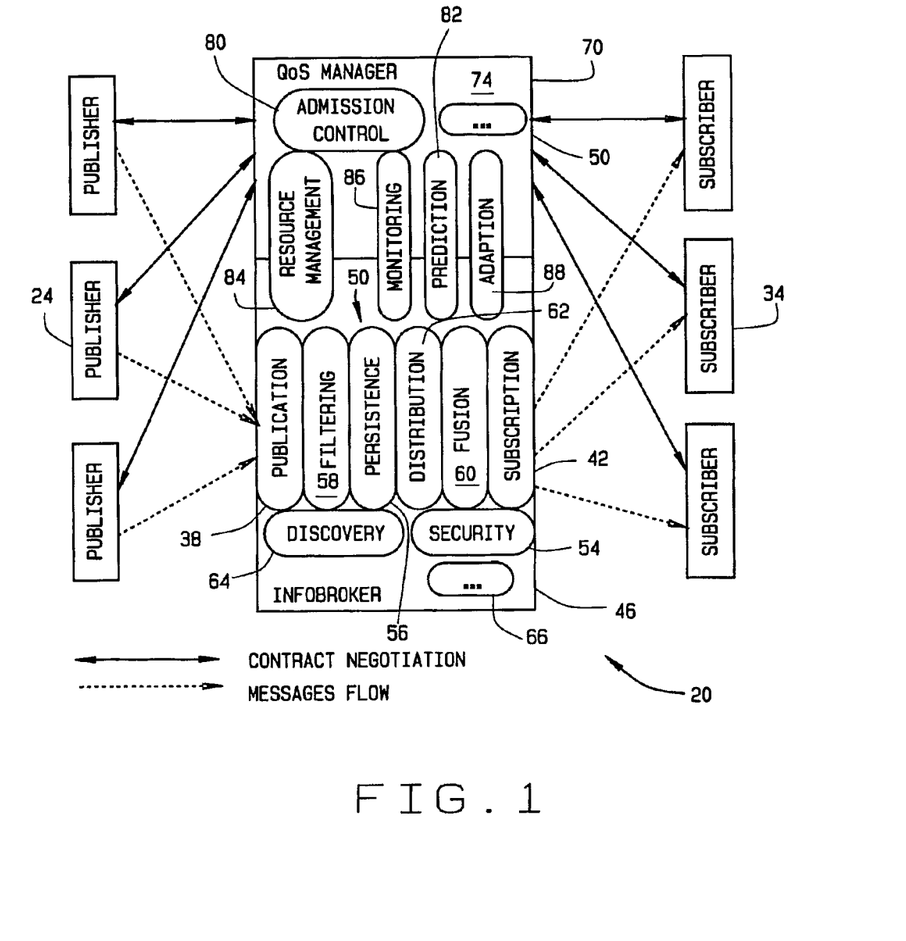
FIG. 1 is a diagram of an exemplary information system having a service-oriented architecture (SOA)

FIG. 1 is a diagram of an information system 20 that implements a SOA. In the exemplary embodiment, information system 20 has a publish/subscribe SOA. Publishers 24 publish messages, for example, on a plurality of topics and subscribers 34 are operated, for example, by interested parties subscribing to messages on particular topics. While shown in diagram form, one or more elements are understood to include a computer processor, an associated memory, and related hardware, where the processor is configured to fetch, decode, and execute computer instructions to implement one or more of the operations corresponding to a method, apparatus, or system as herein described. As such, a computer readable or machine readable medium may be used with the processor to provide the instructions. The computer readable medium may include an optical medium such as a compact disc (CD), a magnetic medium such as a floppy or hard disk, or a solid-state memory such as a random access memory (RAM) or a read-only memory (ROM).

Publication services 38 and subscription services 42 are decoupled through an information broker (InfoBroker) 46. The publishers 24 and subscribers 34 are service requestors (also referred to herein as "clients" and "applications") relative to the InfoBroker 46 as a service provider. Publication services 38 and subscription services 42 are included in common services 50 provided by the InfoBroker 46 to the publishers 24 and subscribers 34. Common services 50 also include security 54, persistence 56, filtering 58, fusion 60, distribution 62 and discovery 64. Additional services 66 such as subscription registration may also be provided. The information broker 46 also provides to the clients 24 and 34 a QoS management service 70 as a common service 50. The information broker 46 provides access to a QoS manager 74 through which a client may negotiate a QoS contract as further described below. The information broker 46 provides quality of service to the clients 24 and 34 via the QoS management service 70 as further described below.

In one embodiment, publishers 24 and subscribers 34 can dynamically discover the InfoBroker 46 and use the foregoing services 50. Such services may have different QoS characteristics and interactions of such services may be dynamic and decoupled. Different publishers 24 and subscribers 34 may have different QoS requirements in terms of performance, reliability, timeliness, and security. For example, some publishers 24 may have higher priority than others and may require their message to be guaranteed delivered with correct ordering in faster response time. Similarly, some subscribers 34 may be more critical than others and thus require shorter delays in receiving messages.

The InfoBroker 46, as a service provider, may provide one or more QoS guarantees to one or more publishers 24 and/or subscribers 34. The InfoBroker 46 may restrict one or more behaviors of publishers 24 and/or subscribers 34, for example, rate(s) of receiving or delivering messages per unit of time and/or message payload size(s). To address QoS requirements of a plurality of concurrent clients such as the publishers 24 and subscribers 34, the QoS management service 70 includes such services as admission control 80, prediction 82, resource management 84, monitoring 86, and adaptation 88.

Publishers 24 and subscribers 34 may express their QoS requirements to the InfoBroker 46 and negotiate for QoS contracts. A QoS contract may be transient or permanent. In this manner, a QoS contract may be transient on a per session basis or permanent for a client having a particular role. The InfoBroker 46 provides resources and mechanisms for satisfying a QoS contract with a client. The InfoBroker 46 monitors system conditions during executions of QoS contracts and provides appropriate adaptation services.

In one configuration, the InfoBroker 46 exports the QoS manager 74 to make available its QoS management service 70 to clients. A client 24 and/or 34 sends its QoS requirements as an eXtensible Markup Language (XML) message to the QoS manager 74. Upon receiving an agreed-upon QoS contract, the client uses the contract as a context for its interactions (e.g., sending and/or receiving messages) with the InfoBroker 46.

The architecture exemplified in FIG. 1 provides component services that cover a plurality of aspects of QoS management for the InfoBroker 46 as QoS service provider. For example, the InfoBroker 46 can analyze application QoS requirements and can make admission control decisions based on policies as well as on current and predicted future system conditions. The InfoBroker 46 can commit system resources and mechanisms to satisfy QoS requirements, and can monitor and adapt system behaviors at runtime.

Generally, in the information system 20, QoS requirements for the services 50 are specified in terms of QoS characteristics. A QoS characteristic describes a concrete aspect or constraint understood by both service requesters and service providers. QoS characteristics can be categorized, for example, into four categories: performance, reliability, timeliness and security. A set of QoS parameters can be associated with each category, for example, as follows. Associated with the performance category are: response time, message throughput, payload size, publishing/subscribing volume rate, and end-to-end delay. Associated with the reliability category are: delivery guarantee, duplication elimination, message ordering, loss probabilities, error rate, retry threshold, message persistency and criticality. Associated with the timeliness category are: time-to-live, deadline, constant bit-rate, frame rate, and priority. Associated with the security category are message signing and encryption.

It should be noted that the foregoing classification of QoS characteristics and parameters is exemplary. Other and/or additional characterizations and/or classifications of aspects of QoS are contemplated. In an example embodiment, and based on the foregoing classification of QoS characteristics and parameters, an XML-based language enables a service requester to express one or more QoS requirements as a QoS message.

Figure 2:
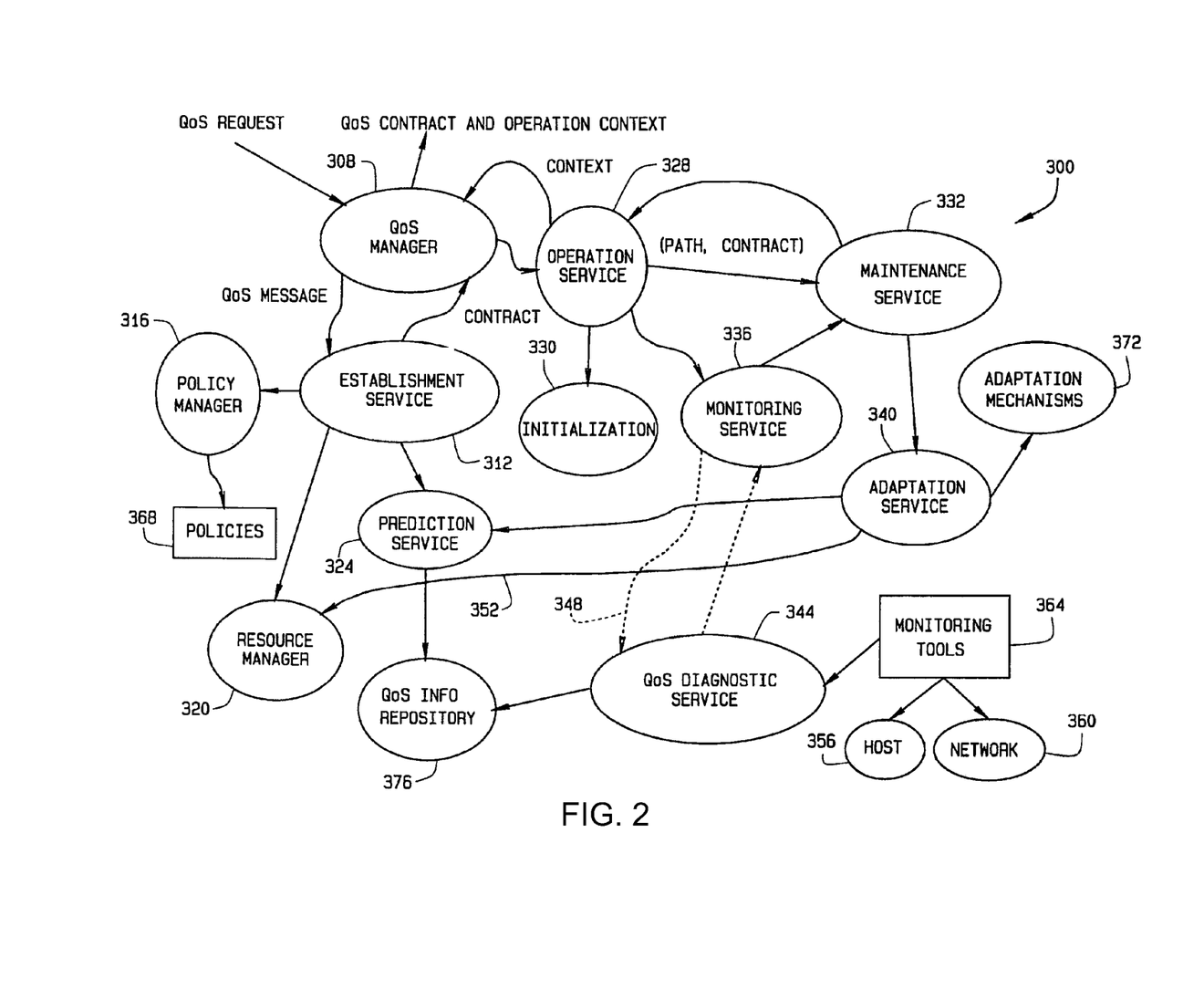
FIG. 2 is a diagram of an exemplary embodiment of a QoS management architecture.

FIG. 2 is a diagram of an exemplary QoS management architecture 300. QoS management architecture 300 may include component services, their interactions, and interfaces with external services such as real-time hosts and network condition monitoring, for example, through commercial off the shelf (COTS) monitoring tools. Key component services include a QoS manager 308, an establishment service 312, a policy manager 316, a resource manager 320, a prediction service 324, an operation service 328, a maintenance service 332, a monitoring service 336, an adaptation service 340, and a diagnostic service 344. Interactions 348 between the monitoring service and the QoS diagnostic service follow a registration and notification style, while interactions 352 among other services are based on a request and reply style. As further described below, the diagnostic service 344 interfaces with external services such as a real-time host 356 and network 360 via COTS monitoring tools 364.

The QoS manager 308 orchestrates establishment and operation of QoS services for clients. The QoS manager 308 provides an interface for clients to access QoS management services, as previously discussed with reference to FIG. 1. The establishment service 312 may establish a QoS contract for a client given a QoS requirement expressed in an XML QoS message as further described below. The establishment service 312 uses the policy manager 316, prediction service 324, and resource manager 320, also as further described below. If a contract cannot be established, the establishment service 312 reports to the QoS manager 308 that made the establishment request on behalf of the client.

The policy manager 316 checks QoS policies 368 to ensure that parameters in a client's QoS requirement are permitted for the client's role, and if permitted, what resources and mechanisms are required to satisfy the requirement. The resource manager 320 provides resource lifecycle management including reservation, allocation, and release for system resources. Since resources typically are local to a platform of the host 356, the resource manager 320 defines abstract classes for general QoS management functions. Examples of platforms are Common Object Request Broker Architecture (CORBA) by the Object Management Group, Java Platform Enterprise Edition (J2EE) by Sun Microsystems, Inc. of Santa Clara, Calif., and .NET framework by Microsoft Corp. of Redmond, Wash. Concrete resource classes are implemented for each host platform as further described below.

The prediction service 324 keeps track of system conditions in terms of several key system parameters (e.g., memory usage, CPU load, network throughput, delay). The prediction service 324 also predicts future system conditions in a small window of time using various prediction algorithms upon request.

The operation service 328 uses an initialization process 330 to initialize resource configuration for a QoS contract and coordinates services during the execution of a QoS contract. The maintenance service 332 may maintain one or more key QoS parameters for a QoS contract and may activate the adaptation service 340 upon threshold crossings with respect to such parameters. The monitoring service 336 samples and aggregates levels of utilization and availability of resources, and measures performance, such as actual throughput and delay values. The monitoring service 336 registers condition predicates with the diagnostic service 344, which returns with notifications when the predicates become true, e.g, due to changes in system conditions.

The adaptation service 340 dynamically changes resources and mechanisms 372 in order to restore key QoS parameters within normal ranges. The adaptation service 340 may also take actions upon contract violations by clients. Such actions may include, for example, slowing down message acceptance from a client which publishes far beyond its agreed publishing rate. When, for example, an observed parameter returns below its threshold value, the maintenance service 332 may request the adaptation service 340 to restore a QoS level according to the QoS contract. An adaptation mechanism 372 can be a plug-in. Thus appropriate adaptation mechanisms 372 can be statically configured and dynamically selected based on policies.

The diagnostic service 344 employs reasoning techniques such as the use of causal networks to aggregate low level system signals into attributes on system conditions. The diagnostic service 344 takes real-time inputs from monitoring tools 364, aggregates data on the fly, and stores the data in a repository 376. The diagnostic service 344 may also evaluate any predicates on the attributes upon value changes and trigger notifications to interested parties, for example, the monitoring service 336.

Clients access QoS management services through the QoS manager 308 by querying a QoS service provider (e.g., an information broker as described with reference to FIG. 1) or by using a discovery service. In an example embodiment, the QoS manager 308 is the only component in the QoS management architecture 300 with which a client directly interfaces for QoS services.

A middleware domain is an environment having one administrative domain within which a middleware solution provides service to a collection of client applications. Examples of middleware domains include the ActiveMQ message broker by the Apache Software Foundation, the JBoss application server, WebSphere by IBM Corp. of Armonk, N.Y., Data Distribution Service (DDS), System of Systems Common Operating Environment (SOSCOE) by the Boeing Company of Chicago, Ill., and CORBA. It would be advantageous to be able to disseminate messages from one middleware domain to another while maintaining QoS support as described with respect to information system 20.

Figure 3:
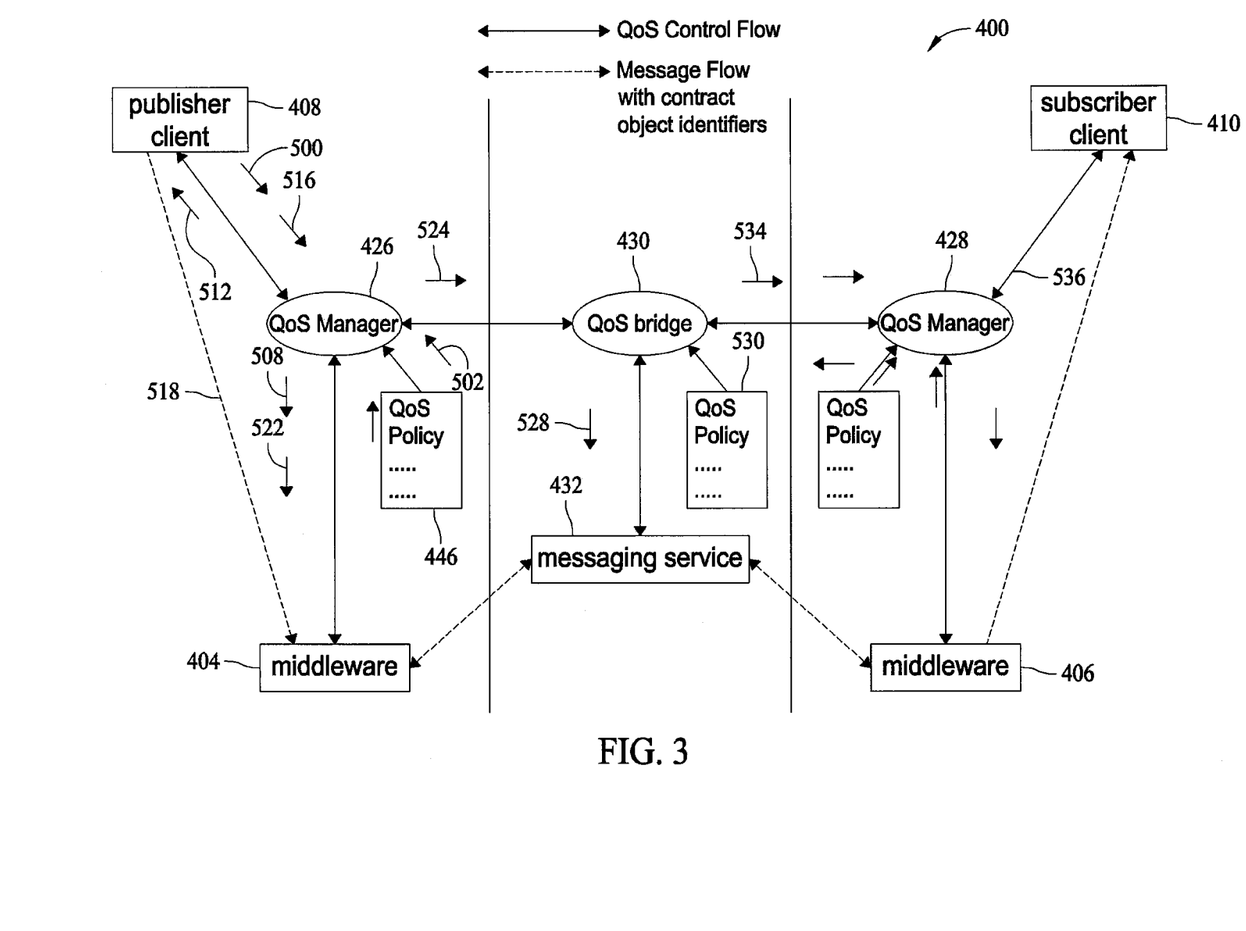
FIG. 3 is a diagram of an exemplary information system that includes multiple middleware domains.

FIG. 3 is a diagram of a message flow through an information system 400 that includes multiple middleware domains, for example, middleware domain 404 and middleware domain 406. Message flow is indicated by dashed lines and contract negotiation, also referred to as control flow, is indicated by solid lines. In the example embodiment, information system 400 has a publish/subscribe SOA implementation. A publisher 408 publishes messages, for example, on a plurality of topics, and a subscriber 410 is operated, for example, by interested parties subscribing to messages on particular topics. A plurality of QoS managers 426 and 428 orchestrate establishment and operation of QoS services for clients. The QoS managers 426 and 428 provide an interface for clients to access QoS management services, as previously discussed with reference to FIG. 1. Information system 400 also includes a QoS bridge 430 and a messaging service 432 to facilitate end-to-end message flow across multiple middleware domains, while maintaining QoS attributes, from publisher 408 to subscriber 410.

As described above, QoS refers to the ability of a system, for example, information system 400, to provide service to clients, for example, publisher 408 and subscriber 410, at different priority levels. For message oriented systems, QoS refers to the assignment of different performance levels on the transport and processing of messages by clients, middleware, and networks. QoS management concerns the setup and control of QoS attributes such as, but not limited to, throughput, latency, jitter (timing variance), loss, durability and persistence. QoS requirements and QoS contracts are collections of these attributes. QoS requirements specify a level of messaging performance requested by an application and QoS contracts specify the level of performance granted (i.e., "promised") to the application. Furthermore, in an example embodiment, should no QoS requirements be specified, a default set of QoS requirements is implied. For example, a default set of QoS requirements may include "promising" a best effort.

An end-to-end message flow starts with the generation of the messages at the producer, for example, publisher 408, and ends at the consumption of the messages by the consumer, for example, subscriber 410. In a system made up of multiple heterogeneous middleware domains, an end-to-end message flow will also include the transport between middleware solutions, and within all the middleware solutions. Maintaining QoS attributes is a fundamental component of real-time, mission critical environments. System endpoints, as well as message handling intermediaries, must adhere to QoS contracts specifying servicing needs. Typically, known middleware technologies provide some level of QoS support. However, the level of QoS support varies from technology to technology, from relative priorities between flows to concepts such as traffic shaping and data durability.

QoS bridge 430 enables middleware solutions 404 and 406 to share QoS contracts that have been established with respective client applications such that message flows between applications on different middleware domains are provided with a consistent level of QoS within and across a plurality of interconnected middleware environments or domains. A particular protocol (not shown in FIG. 3) is used by QoS managers 426 and 428 in middleware domains 404 and 406, respectively, for propagating (i.e., forwarding and receiving) established QoS contracts via QoS Bridge 430. The protocol is used by QoS managers 426 and 428 such that the QoS settings in a contract that has been established with a publisher in one middleware domain can be used as the QoS requirements when forwarding messages to a different middleware domain. For example, a contract established between publisher 408 and QoS manager 426 can be used as the QoS requirements sent to QoS manager 428 from QoS bridge 430.

QoS manager 426 is responsible for the setup and maintenance of QoS contracts with applications in its domain, for example, publisher 408. QoS manager 426 receives QoS requirements from publisher 408 and proposes a contract as dictated by a QoS policy 446 and available resources. When accepted by publisher 408, the contract becomes binding. QoS manager 426 applies the contract by translating the QoS contract to a set of QoS parameters specific to middleware domain 404 and setting an association between the set of QoS parameters and publisher 408. For example, when publisher 408 accepts a QoS contract, QoS manager 426 creates a middleware connection to publisher 408 and sets the QoS parameters in the connection.

QoS manager 426 also sends QoS requirements to QoS bridge 430, which in turn propagates the QoS requirements to other middleware domains, for example, middleware domain 406. QoS bridge 430 is a specialized QoS manager. More specifically, QoS bridge 430 is a QoS manager between middleware domains. Rather than interacting with client applications and middleware solutions, QoS bridge 430 interacts with QoS managers and a messaging service, for example, QoS manager 426 and messaging service 432. Messaging service 432 provides interoperability between two or more middleware domains that includes enforcing the QoS settings of each message flow established between QoS manager 426 and QoS bridge 430. In an example embodiment, message flows arriving at messaging service 432 without explicit QoS requirements are treated as being associated with a default set of QoS requirements, for example, a set of QoS requirements that guarantee a best effort approach.

An exemplary method for end-to-end communication across multiple middleware domains is also illustrated in FIG. 3. Publisher type client application 408 initiates 500 a message flow by submitting its QoS requirements to QoS manager 426. QoS requirements are written in a middleware independent language. QoS manager 426 creates 502 a middleware independent QoS contract based on the received QoS requirements, the QoS policy 446, and available resources. A unique identifier is associated with the contract. The QoS contract may be further based on, but is not limited to being based only on: the QoS requirements, operator role, content type user account, available computing resources (local and/or remote), and available network resources.

QoS manager 426 translates 508 the middleware independent QoS contract to a middleware specific resource plan. The resource plan contains the levels of computing and network resources needed to satisfy the contract. The QoS contract is sent 512 to publisher 408 and publisher 408 receives the contract. Publisher 408 issues 516 an accept message to QoS manager 426 and commences 518 the publication of messages to the message flow.

QoS manager 426 implements 522 the resource plan. The computing and network resources called out in the resource plan are allocated for the message flow. In an example embodiment, the resource plan and QoS contract are used for at least one of the following: determining the allocation of computing resources such as memory for buffers and dedicated threads for servicing urgent priority flows, setting process and thread priorities, and marking network packets, for example, with appropriate DiffServ code points.

QoS manager 426 disseminates 524 the QoS requirements to QoS bridge 430. QoS bridge 430 takes the QoS requirements received from the source middleware domain (i.e. origination of publication) and interacts 528 with messaging service 432 to create a client connection with the originating middleware domain for receiving the message flow. The QoS bridge 430 also translates the received QoS requirements using a bridge policy 530 to a set of QoS parameters specific to messaging service 432, which connects middleware domains 404 and 406. QoS bridge 430 also disseminates the received QoS requirements for the message flow to downstream middleware domain 406, as is, or modified in accordance with bridge policy 530.

QoS manager 428 at the destination middleware domain 406 performs the same steps as the originating QoS manager 426, as described above. In other words, QoS manager 428 creates 534 a "local" QoS contract and the equivalent resource plan, reserves resources, send the contract to the client (which in this case is QoS Bridge 430), and upon acceptance, implements the resource plan.

Client applications, for example, subscriber 410, subscribe 536 to the message flow with their respective middleware 406. This subscription may occur at any point in time since this step is independent of the other control flow communications.

In an alternative embodiment, rather than QoS requirements from publisher 408, the QoS contract in place between publisher 408 and QoS manager 426 is disseminated 524 between QoS manager 426 and QoS bridge 430. In a control flow situation where what is granted by QoS manager 426 at the source domain 404 is a significantly lower level of QoS than was requested by publisher 408, it would not be beneficial for downstream domain 406 to reserve the level of resources requested in the original requirements. By disseminating the QoS contract rather than the original QoS requirements, unnecessarily cumbersome resource reserves may be avoided.

Figure 4:
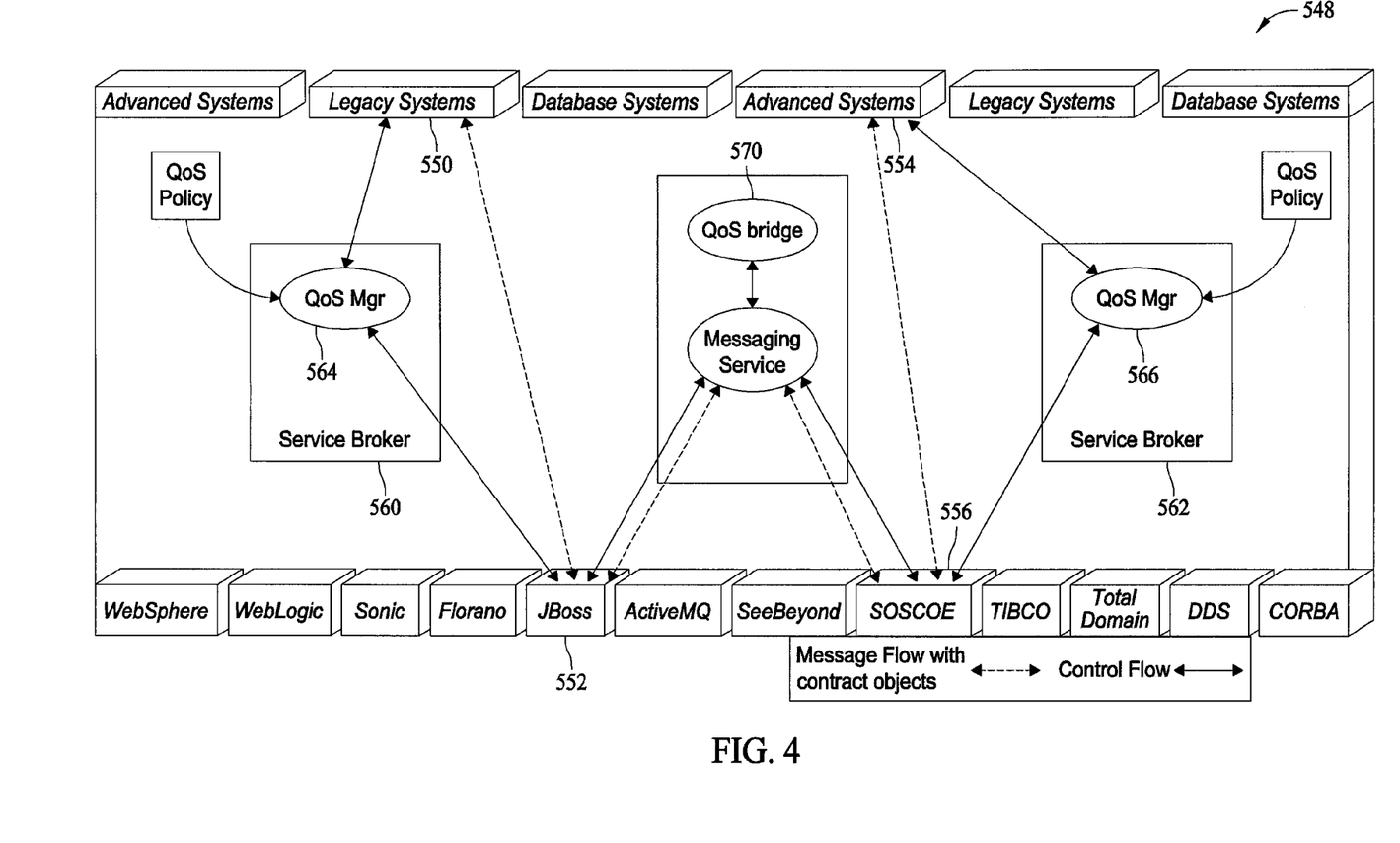
FIG. 4 is a diagram of an exemplary embodiment of an application of the information system of FIG. 3. As used herein, the term exemplary indicates an example, and not necessarily an ideal.

FIG. 4 is a diagram of an exemplary embodiment of an application of information system 400 described above. FIG. 4 illustrates an information system 548 for applying a policy driven QoS on messages flows across multiple middleware domains. In the example embodiment, client applications 550 of a legacy system that are hosted on a JBoss middleware 552 need to share information with client applications 554 of an advanced system hosted on a SOSCOE middleware 556. A service broker 560 acts as a mediator between client applications 550 and middleware platform 552. A service broker 562 performs the same functions for client applications 554 on behalf of middleware platform 556. Service broker 560 includes a QoS manager 564 and service broker 562 includes a QoS manager 566. A QoS bridge 570 enables messages from middleware domain 552 to be shared with middleware domain 556. QoS bridge 570 is a particular type of QoS manager that receives QoS requirements for a message flow from QoS manager 564 and works with QoS manager 566 to apply the same set of QoS requirements on continuations of the same message flow.

Advanced systems, legacy systems, and database systems are examples of systems that may operate in various middleware domains. Service brokers 560 and 562 translate between middleware-specific systems and middleware-independent systems. In addition, the service brokers 560 and 562 authenticate these systems and authorize and administer their servicing needs. Service brokers 560 and 562 may also prioritize the transmission of individual messages in message flows according to established QoS contracts when message prioritization is absent from associated middleware platforms.

The above described embodiments provide an effective end-to-end QoS management architecture that allows messaging between different middleware solutions. The QoS managers in the service brokers and the QoS bridge translate QoS requirements to the appropriate middleware specific target format to provide the necessary allocation of resources to support predictable, adaptive, guaranteed message delivery and priority routing.

The methods and systems described above enable QoS requirements/contracts to specify treatment for an entire message flow from endpoint to endpoint. QoS contracts are consistently enforced by middleware domains and intermediary (bridging) nodes. QoS policies are re-definable and are used to control the establishment of QoS contracts from QoS requirements, the translation of QoS requirements/contracts to middleware specific resource plans, and the translation of QoS requirements/contracts to network parameter settings.

The foregoing various configurations described above may be seen additionally to embody a machine-readable medium for use with a processor having a memory. The machine-readable medium may include instructions to cause a processor to receive a QoS message from a client of an information system expressing one or more QoS requirements as one or more parameter values. The machine-readable medium also includes instructions to cause a processor to establish a contract with the client for quality of service based on the one or more parameter values. The machine-readable medium includes instructions to cause a processor to allocate one or more resources of the information system to the client based on the contract. Additionally, the machine-readable medium includes instructions to disseminate the received QoS message to downstream middleware domains.

In a SOA in which a configuration of the foregoing QoS management system is implemented, an InfoBroker can offer differentiated services to clients of different roles and QoS requirements. The InfoBroker thus can optimize the allocation and utilization of resources to satisfy requirements from many concurrent clients. Highly critical clients get more resources or more shares of resource utilization than less critical clients. Also the above described QoS management system allows endpoint-to-endpoint transmission of messages across multiple middleware domains while maintaining QoS requirements.

Configurations of the foregoing system can be used to manage network throughput to provide reliable information delivery based on priorities. Because resources are modeled in an object-oriented approach, the foregoing method enables uniform resource management and polymorphic resource allocation across multiple middleware platforms.

The above-described XML-based QoS language provides a flexible and extensible way for applications to express QoS requirements in various aspects of QoS characteristics. QoS service providers thus can be provided with an architecture that integrates and processes of all aspects of QoS characteristics in a single framework. In the foregoing system, resources of an information system are modeled as software objects to provide polymorphic resource allocation across multiple middleware platforms. QoS characteristics for both tasks and messages are managed in a single framework. QoS requirements of concurrent applications are satisfied, for example, through a QoS service provider in a system middleware layer.

Resources are classified into categories based on their utilities, greatly simplifying their configurations at runtime. The foregoing resource allocation method may be policy-based and is easily modified and extensible. The method demonstrably shortens delays for highly critical clients than less critical clients by effectively managing allocated resources. Configurations can adapt resource allocations when runtime behaviors of clients change to enforce client QoS contracts.

While the invention has been described in terms of various specific embodiments, those skilled in the art will recognize that the invention can be practiced with modification within the spirit and scope of the claims.

What is claimed is:

1. A method of providing a consistent level of quality of service (QoS) in an information system including a first middleware domain and a second middleware domain, the method comprising:
   receiving, at a QoS bridge, at least one QoS requirement from a first QoS manager associated with the first middleware domain, wherein the at least one QoS requirement is received by the first QoS manager from a first client associated with the first middleware domain;
   propagating the at least one QoS requirement from the QoS bridge to a second QoS manager associated with the second middleware domain;
   translating by the QoS bridge the at least one QoS requirement to at least one QoS parameter specific to a messaging service that communicatively couples the first and second middleware domains such that the at least one QoS parameter is received by a second client associated with the second middleware domain; and
   utilizing the messaging service to receive and enforce the at least one QoS parameter and facilitate a message flow between the first and second middleware domains, with a consistent QoS between the first client and the second client.

2. A method according to claim 1, further comprising establishing a first QoS contract between the first QoS manager and the first client based on the at least one QoS requirement.

3. A method according to claim 2, wherein receiving the at least one QoS requirement from the first QoS manager comprises receiving the first QoS contract from the first QoS manager.

4. A method according to claim 2, further comprising governing interaction of the first client with the information system based on the first QoS contract.

5. A method according to claim 1, further comprising:
establishing a second QoS contract based on the QoS message; and
governing interaction of the messaging service and the second middleware domain based on the second contract.

6. A method according to claim 1, further comprising:
receiving a plurality of QoS messages from a plurality of QoS managers preparing to publish or subscribe a message or request a task execution; and
establishing QoS contracts with the QoS managers based on the requirements expressed in the QoS messages.

7. A method according to claim 1, further comprising applying a default QoS message should no QoS requirement be provided from the first QoS manager, the default QoS message expressing at least one QoS requirement when creating the client connection between the first middleware domain and the messaging service for receiving the message flow.

8. A quality of service (QoS) bridge for providing a message flow having a consistent level of QoS across a first middleware domain and a second middleware domain, said QoS bridge embedded in a memory and executed on a processing device, said QoS bridge configured to:
receive a QoS message expressing at least one QoS requirement from a first QoS manager associated with the first middleware domain;
propagate the at least one QoS requirement to a second QoS manager associated with the second middleware domain; and
translate the at least one QoS requirement to at least one QoS parameter, said QoS bridge configured to utilize a messaging service to receive and enforce the at least one QoS parameter and facilitate the message flow having a consistent QoS between clients associated with the first and second middleware domains.

9. A QoS bridge according to claim 8, wherein the at least one QoS requirement comprises a QoS contract based on at least one of a QoS policy and available resources.

10. A QoS bridge according to claim 8, wherein the QoS bridge provides end-to-end message flow having consistent QoS between the first and second middleware domains.

11. A non-transitory computer-readable medium for managing quality of service (QoS) in an information system that includes at least a first middleware domain and a second middleware domain, wherein the non-transitory computer-readable medium includes computer-executable instructions embodied thereon, wherein when executed by at least one processor, the computer-executable instructions cause the at least one processor to:
execute a first QoS manager on said at least one processor such that a QoS message expressing at least one QoS parameter is received from a first client associated with the first middleware domain;
execute a QoS bridge on said at least one processor such that the QoS message is received from said first QoS manager; and
execute a second QoS manager on said at least one processor such that the QoS message from said QoS bridge is received by said second QoS manager and forwarded to a second client associated with the second middleware domain, providing end-to-end message flow having consistent QoS between the first and second clients.

12. A non-transitory computer-readable medium according to claim 11, wherein the computer-executable instructions further cause said at least one processor to execute a messaging service on said at least one processor such that the message flow from the first middleware domain is received at said messaging service, facilitated by said QoS bridge.

13. A non-transitory computer-readable medium according to claim 12, wherein said QoS bridge executed on said at least one processor is configured to disseminate the received QoS message to said second QoS manager.

14. A non-transitory computer-readable medium according to claim 12, wherein said QoS bridge executed on said at least one processor is configured to modify the received QoS message using a bridge policy to a set of QoS parameters specific to said messaging service.

15. A non-transitory computer-readable medium according to claim 11, wherein said first QoS manager executed on said at least one processor is configured to establish a first QoS contract between said first QoS manager and the first client.

16. A non-transitory computer-readable medium according to claim 15, wherein said QoS bridge executed on said at least one processor is configured to receive said first QoS contract from said first QoS manager.

17. A non-transitory computer-readable medium according to claim 11, wherein at least one of said first QoS manager executed on said at least one processor, said QoS bridge executed on said at least one processor, and said second QoS manager executed on said at least one processor is configured to allocate at least one resource of said information system to a client based on at least one of a policy and the QoS message.

18. A non-transitory computer-readable medium according to claim 11, wherein said QoS bridge executed on said at least one processor is configured to at least one of:
check at least one policy of the system with regard to the at least one QoS parameter and determine at least one resource for satisfying a requirement of the first client expressed in the at least one QoS parameter; and
check at least one policy of the system with regard to the at least one QoS parameter in the QoS message from the first QoS manager and determine at least one QoS parameter and transmit a QoS message to the second QoS manager based on the at least one QoS parameter.

* * * * *